(12) United States Patent
Prieto et al.

(10) Patent No.: US 10,581,992 B2
(45) Date of Patent: Mar. 3, 2020

(54) ALLOCATING BANDWIDTH BETWEEN NETWORK COMPUTING DEVICES FOR PUSHING DATA TO A CLIENT COMPUTING DEVICE

(71) Applicant: Cisco Technology, Inc., San Jose, CA (US)

(72) Inventors: Alberto Gonzalez Prieto, Mountain View, CA (US); Alexander Clemm, Los Gatos, CA (US); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 15/085,715

(22) Filed: Mar. 30, 2016

(65) Prior Publication Data

US 2017/0289286 A1    Oct. 5, 2017

(51) Int. Cl.
*H04L 5/00* (2006.01)
*H04L 29/08* (2006.01)
(Continued)

(52) U.S. Cl.
CPC .......... *H04L 67/26* (2013.01); *H04L 41/0896* (2013.01); *H04L 47/12* (2013.01);
(Continued)

(58) Field of Classification Search
CPC ........ H04L 5/003; H04L 5/0064; H04L 47/22
See application file for complete search history.

(56) References Cited

U.S. PATENT DOCUMENTS

| | | | | |
|---|---|---|---|---|
| 8,285,141 B1 * | 10/2012 | Crowe | ................ | H04J 14/0256 398/45 |
| 2004/0064607 A1 * | 4/2004 | Odakura | ............... | G06F 1/3209 710/57 |

(Continued)

FOREIGN PATENT DOCUMENTS

| | | |
|---|---|---|
| EP | 1 074 124 A2 | 2/2001 |
| WO | WO 99/54805 | 10/1999 |

OTHER PUBLICATIONS

The International Bureau of WIPO, "Search Report" in application No. PCT/US2017/022704, dated Oct. 2, 2018, 8 pages.

(Continued)

*Primary Examiner* — Jeong S Park
(74) *Attorney, Agent, or Firm* — Lee & Hayes, P.C.

(57) ABSTRACT

Computer systems and methods for allocating bandwidth so that server computers can send data to a client computer without exceeding the available bandwidth between the server computers and the client computer, or the processing bandwidth or capacity of the client computer, are discussed herein. In an embodiment, a method comprises determining a first share of bandwidth that is to be available for a first computing device to send data to the client computer during a first future period of time; determining a first rate at which the first computing device is to send data to the client computer during the first future period of time; determining that the first rate is less than the first share of bandwidth that is to be available for the first computing device to send data (Continued)

to the client computer during the first future period of time by a first delta; receiving, from a second computing device among the plurality of network computing devices, a first request for additional rate allocation; sending, to the second computing device, a first rate allocation that is equal to or less than the first delta; sending data to the client computer during the first future period of time at a first actual rate that is less than or equal to the first rate minus the first rate allocation.

19 Claims, 3 Drawing Sheets

(51) Int. Cl.
    *H04L 12/825* (2013.01)
    *H04L 12/801* (2013.01)
    *H04L 12/24* (2006.01)
    *H04L 29/06* (2006.01)
(52) U.S. Cl.
    CPC .............. *H04L 47/15* (2013.01); *H04L 47/17* (2013.01); *H04L 47/25* (2013.01); *H04L 67/327* (2013.01); *H04L 67/42* (2013.01)

(56) References Cited

U.S. PATENT DOCUMENTS

| | | | |
|---|---|---|---|
| 2008/0016217 A1 | 1/2008 | Astley et al. | |
| 2010/0061234 A1* | 3/2010 | Pai ...................... | H04L 12/2801 370/230.1 |
| 2011/0058473 A1* | 3/2011 | Krym ................... | H04W 48/06 370/232 |
| 2012/0044955 A1* | 2/2012 | Chandrasekaran ......................... | H04L 41/0896 370/468 |
| 2012/0096167 A1* | 4/2012 | Free ...................... | G06F 9/5011 709/226 |
| 2013/0318522 A1* | 11/2013 | Devireddy .......... | H04L 12/6418 718/1 |
| 2015/0282180 A1* | 10/2015 | Owen ................. | H04L 12/4641 370/329 |

OTHER PUBLICATIONS

Current Claims in Application No. PCT/US2017/022704, dated Oct. 2018, 7 pages.

Araujo F. et al., "On QoS-aware Publish-Subscribe", Distributed Computing Systems Workshops, dated 2002, 5 pages.

\* cited by examiner

ALLOCATING BANDWIDTH BETWEEN NETWORK COMPUTING DEVICES FOR PUSHING DATA TO A CLIENT COMPUTING DEVICE

TECHNICAL FIELD

Computer systems and methods for improving performance of server and client computers, and more specifically, computer-implemented techniques for allocating bandwidth between network computing devices and a client computing device so that the network computing devices can send data to the client computing device without exceeding the available bandwidth between the network computing devices and the client computing device are discussed herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A monitoring application (referred to herein as a data consumer) on a client computer may receive updates that indicate the status of computing devices on a computer network (referred to herein as data producers). Ideally, a consumer application receives as many messages as necessary from each computing device to have an accurate view of the state of each computing device.

A data consumer may obtain the state of one or more data producers through poll-based methods (sometimes referred to as "pull-based" methods) or push-based methods. In poll-based solutions, the data consumer periodically polls or requests data from the data producer. However, if the period is too short, then the data consumer will get redundant state data. If the period is too long, then the state of the data producer can change between requests without the data consumer knowing about the one or more state changes. If the data consumer goes offline or stops polling data producer, then the data producer will not send data to the data consumer.

Push-based techniques follow a publisher/subscriber paradigm. In pushed-based solutions, a data consumer sends a request for data to the data producer. The request may indicate what data the data consumer is interested in and how the data consumer wants to receive the data. The data producer may send data to the data consumer according to the request.

Push-based techniques can be more efficient for several reasons. For the example, the data producer may send data to the data consumer when the data producer changes state. The data consumer need not send a separate request for each data update, which may reduce the number of interrupts or requests that a data publisher needs to process. Data producers can push updates simultaneously and issues with regard to requests arriving at different times at different systems may be avoided.

However, the data consumer has no control of how much bandwidth the data producer may use. For example, during some hours, the data producer may send so much data to the data consumer that the data consumer's network or processor bandwidth is overloaded. As a result, data or messages from the data producer or other computer systems to the data consumer may be delayed or dropped. The data consumer may become overloaded more quickly in a system with more than one data producer sending data to the data consumer.

SUMMARY

The appended claims may serve as a summary of the invention.

Figure 1:
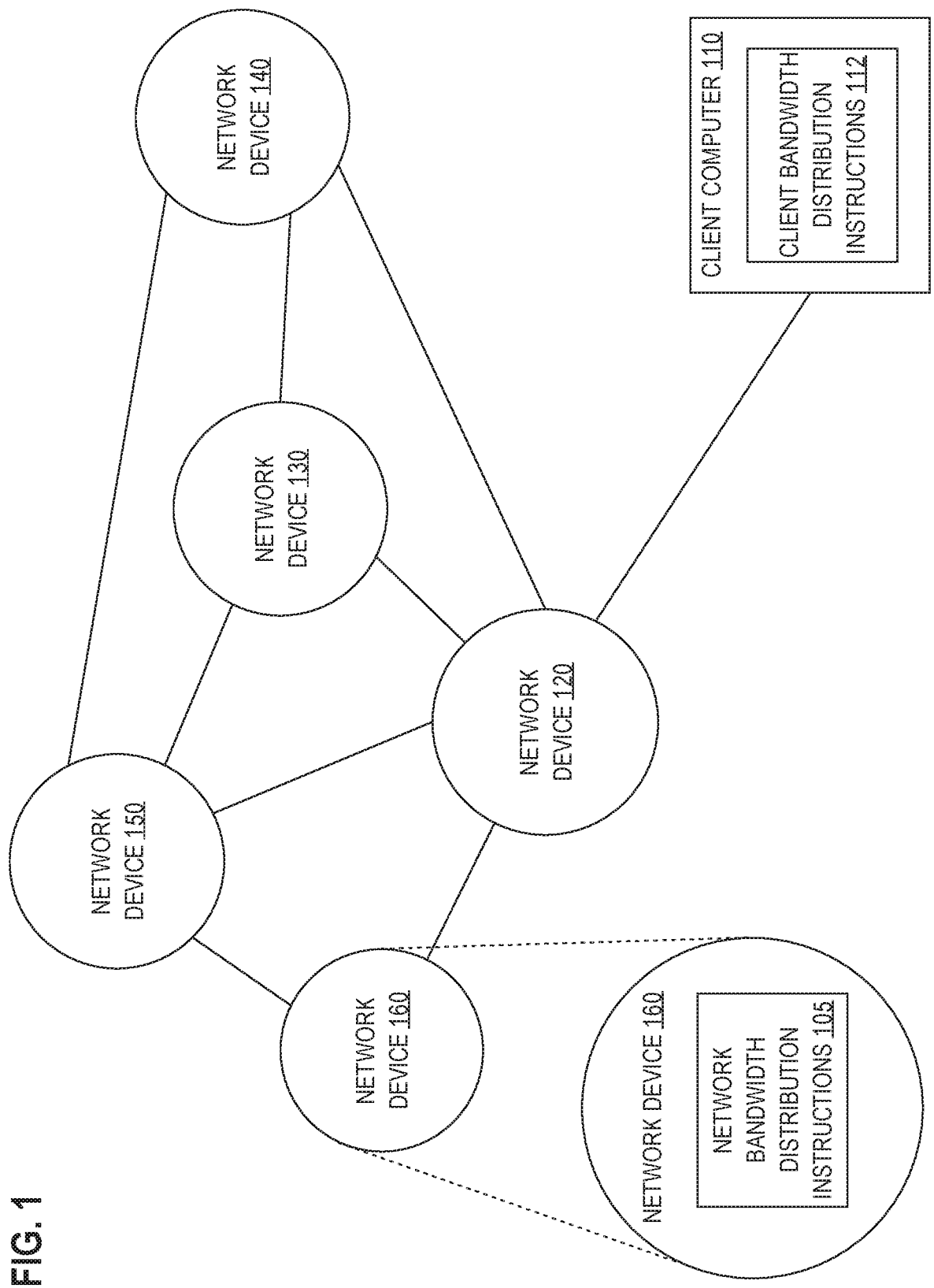
FIG. 1 illustrates an example networked environment with a plurality of network devices (data producers) and a client computer (data consumer) according to an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, client computer 110 and network device 120 in FIG. 1 may be described with reference to several steps in FIG. 2 and discussed in detail below, but using the particular arrangement illustrated in FIG. 1 is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or" may be inclusive or exclusive unless expressly stated otherwise.

Embodiments are described herein according to the following outline:

1.0 General Overview
2.0 Example Network Topology for Distributing a Data Consumer's Bandwidth
3.0 Process for Distributing the Rate that Network Computing Devices Send Data to a Client Computer
   3.1 Determining a Share of Bandwidth Available for each Computing Device
   3.2 Determining a Rate at which A Computing Device would Ideally Send Messages
   3.3 Determining Whether a Computing Device Needs Additional Bandwidth or has Surplus Bandwidth
   3.4 Requesting and Distributing Rate Allocations
   3.5 Sending Messages or Data According to Distributed Rates
   3.6 Prioritizing Types of data or messages
4.0 Implementation Mechanisms—Hardware Overview
5.0 Other Aspects of Disclosure
1.0 General Overview Systems and methods are discussed herein for data producers to distribute the bandwidth that a data consumer is estimated to have so that each data producer is able to send data at a rate that the data consumer can receive and process. In embodiment, a computer system comprising: a first computing device that is programmed to: determine a first share of bandwidth that is to be available for the first computing device to send data to a client computer during a future period of time; determine a first rate at which the first computing device is to send data to the client computer during the future period of time; determine that the first rate is less than the first share of bandwidth that is to be available for the first computing device to send data to the client computer during the future period of time by a first delta; a second computing device that is communicatively coupled to the first computing device and that is programmed to: determine a second share of bandwidth that is to be available for the second computing device to send data to the client computer during the future period of time; determine a second rate at which the second computing device is to send data to the client computer during the future period of time; determine that the second rate is greater than the second share of bandwidth that is to be available for the second computing device to send data to the client computer during the future period of time by a second delta; send a first request for additional rate allocation to one or more computing devices, which includes the first computing device; receive, from the first computing device, a first rate allocation that is equal to or less than the first delta; wherein the first computing device is programmed to send data to the client computer during the future period of time at a first actual rate that is less than or equal to the first rate minus the first rate allocation.

In an embodiment, the first computing device is configured to determine a first amount of data that the first computing device will send to the client computer during the future period of time, and the first computing device determines the first rate based on the first amount of data and a length of time that the future period of time spans.

In an embodiment, the first computing device is configured to determine the first amount of data that the first computing device will send to the client computer based on one or more amounts of data that have been sent by the first computing device to the client computer during one or more previous periods of time, respectively.

In an embodiment, the second computing device is configured to: determine that the second rate is greater than the second share of bandwidth plus the first rate allocation; send a second request for additional rate allocation to the one or more computing devices of the plurality of computing devices.

In an embodiment, the computer system comprises a third computing device, and the second computing device is configured to: receive, from the third computing device, a second rate allocation; determine that the second rate is less than or equal to the second share of bandwidth plus the first rate allocation and the second rate allocation; send data to the client computer at a second actual rate that is less than or equal to the second share of bandwidth plus the first rate allocation and the second rate allocation.

In an embodiment, the second computing device is configured to: determine a first partial rate at which the second computing device is to send data associated with a first priority to the client computer; determine a second partial rate at which the second computing device is to send data associated with a second priority to the client computer; wherein the second rate is a sum of at least the first partial rate and the second partial rate; determine that the first partial rate is less than the second share of bandwidth plus the first rate allocation; send data in a plurality of first messages associated with the first priority at a second actual rate that is equal to or less than the first partial rate; send data in a plurality of second messages associated with the second priority at a third actual rate that is equal to or less than the sum of the second share of bandwidth plus the first rate allocation, but minus the first partial rate.

In an embodiment, the computer system comprises a third computing device, wherein the first request includes the second delta, and the third computing device is configured to: determine a third rate at which the third computing device is to send data to the client computer during the future period of time; determine that the third rate is greater than a third share of bandwidth that the third computing device is to be available during the future period of time by a third delta; send a second request for additional rate allocation to the one or more computing devices of the plurality of computing devices, wherein the second request includes the third delta; wherein the first computing device is configured to: receive, from the second computing device, the first request with the second delta; receive, from the third computing device, the second request with the third delta; determine that the second delta is greater than the third delta, and in response: send, to the second computing device, the first rate allocation, wherein the first rate allocation is less than the first delta; send, to the third computing device, a second rate allocation, wherein the second rate allocation is less than the first delta and the first rate allocation.

In an embodiment, a method for rationing the amount of bandwidth used by a plurality of network computing devices sending data to a client computer, the method comprising: determining a first share of bandwidth that is to be available for a first computing device, among the plurality of network computing devices, to send data to the client computer during a first future period of time; determining a first rate at which the first computing device is to send data to the client computer during the first future period of time; determining that the first rate is less than the first share of bandwidth that is to be available for the first computing device to send data to the client computer during the first future period of time by a first delta; receiving, from a second computing device among the plurality of network computing devices, a first request for additional rate allocation; sending, to the second computing device, a first rate allocation that is equal to or less than the first delta; sending data to the client computer during the first future period of time at a first actual rate that is less than or equal to the first rate minus the first rate allocation.

2.0 Example Network Topology for Distributing a Data Consumer'S Bandwidth

FIG. 1 illustrates an example networked environment with a plurality of network devices (data producers) and a client computer (data consumer) according to an example embodiment. In FIG. 1, system 100 comprises client computer 110, network device 120, network device 130, network device 140, network device 150, and network device 160, collectively referred to herein for purposes of brevity as computers 110-160. Computers 110-160 are communicatively coupled directly or indirectly over one or more computer networks or internets and may discover each other using one or more standard or proprietary protocols, such as Border Gateway Protocol ("BGP"). For example, in FIG. 1, network device 130 is communicatively coupled with network device 160 through network device 150. Also for example, client computer 110 is communicatively coupled with network devices 130-150 through network device 120 or network device 160. Furthermore, computers 110-160 may be communicatively coupled through one or more computers that are not illustrated in FIG. 1.

Figure 2:
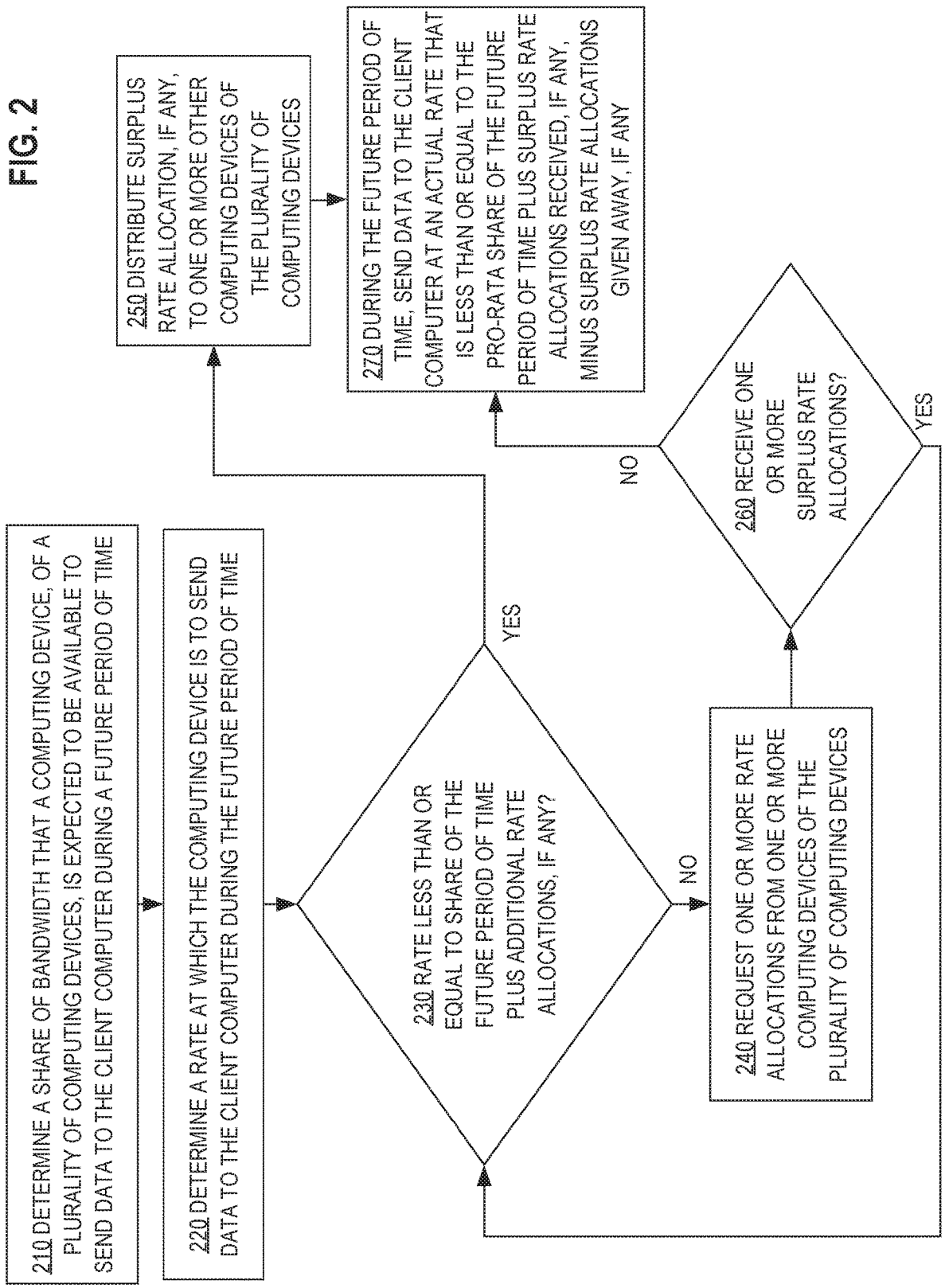
FIG. 2 illustrates a process for distributing the rate that computing devices send data to a client computer.

Each of the network devices in FIG. 1 may include hardware or software configured to implement one or more features or steps discussed herein or illustrated in FIG. 2. For example, FIG. 1 includes an exploded view of network device 160, which includes network bandwidth distribution instructions 105. Network bandwidth distribution instructions 105 may be computer logic or executable instructions, which when executed by network device 160 are cause network device 160 to implement one or more features or steps discussed herein or illustrated in FIG. 2. Each network device among network devices 120-160 may host, execute, or implement a copy of network bandwidth distribution instructions 105 or similar instructions.

Client computer 110 may include hardware or software configured to implement one or more features or steps discussed herein or illustrated in FIG. 2. For example, client computer 110 may include client bandwidth distribution instructions 112. Client bandwidth distribution instructions 112 may be computer logic or executable instructions that cause client computer 110 to implement one or more features or steps discussed herein.

For purposes of illustrating a clear example, client computer 110 is labeled as a computer and network devices 120-160 are labeled as network devices; however, computers 110-160 may each be a computer. A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, routers, hubs, switches, desktop computers, laptop computers, mobile devices, or any other special-purpose computing devices. Any reference to "a computer" herein may mean one or more computers, unless expressly stated otherwise. Further, for purposes of illustrating a clear example, a limited number of elements are shown in FIG. 1 but other embodiments may use any number of network devices or computers.

While each of the components listed above is illustrated as if running on a separate, remote computer from each other, one or more of the components listed above may be part of or executed on the same computer. For example, network device 120 and network device 130 may be two software applications that are executed on the same computer, and each software application may produce and send data to client computer 110. Additionally or alternatively, network device 120 may be a software application that is executed on client computer 110, and the software application may send data to client computer 110 over one or more standard or proprietary networking protocols. A non-limiting example of a standard networking protocol may be the Transmission Control Protocol (TCP) and the Internet Protocol (IP), referred to as TCP/IP.

3.0 Process for Distributing the Rate that Network Computing Devices Send Data To a Client Computer In some situations, network devices 120-160 may produce and send data to client computer 110 at a rate that is higher than client computer 110 can process. For example, network devices 120-160 may send more data during a particular period of time than client computer 110 can process or has bandwidth to receive. Sending more data than client computer 110 may receive due to bandwidth limitations, processing limitations, or other limitations, may be referred to as overloading client computer 110. If left unregulated, messages from network devices 120-160 may be dropped, or client computer 110 may stop receiving messages, shutdown, or otherwise become completely or partially unresponsive. FIG. 2 illustrates a process for distributing the rate that computing devices send data to a client computer. In an embodiment, each of the elements of FIG. 1 host or execute program instructions that implement the algorithm shown in FIG. 2 and further disclosed in other sections herein.

3.1 Determining a Share of Bandwidth Available for Each Computing Device

Referring now to FIG. 2, in step 210, each computing device, of a plurality of computing devices sending data to a client computer, determines a share of bandwidth that the computing device is expecting to be available for the computing device to send data to the client computer during a future period of time. The bandwidth may be an amount of data over the future period of time. Accordingly, the share available to each network device may be based on the rate at which the client computer can receive data without being overloaded and the total number of computer devices among the plurality of computer devices (message producers) sending data to the client computer. The period of time may be an upcoming second, minute, hour, or other amount of time that begins or ends at a particular point in time.

For purposes of illustrating a clear example, assume that client computer 110 is receiving data produced by network devices 120-160, and determines that the total available amount of data that client computer 110 is able to receive and processes from network devices 120-160 is fifty megabits per minute. Client computer 110 may send data to network devices 120-160 indicating that client computer 110 is receiving data from network devices 120-160 and can receive and process fifty megabits per minute, beginning at the top of each minute. Accordingly, each network device in network devices 120-160 may determine that the network device can send an equal amount or pro-rata share of data per minute to client computer 110 without overloading client computer 110. Accordingly, in this example, each network device, among network devices 120-160, may determine that the network device has a bandwidth share of ten megabits per minute.

In an embodiment, the size of each message sent from a computing device to the client computer may be fixed. Accordingly, bandwidths, shares, or rates may be the number of messages that the client computer can receive over a future period of time without being overloaded. Additionally or alternatively, the rate may be based on an amount of time that is different than the period of time. For example, client computer 110 may send data to network devices 120-160 indicating that it can receive and processes up to 10 messages per minute over the next five minutes.

3.2 Determining a Rate at Which a Computing Device Would Ideally Send Messages

In step 220, each computing device, of the plurality of computing devices, determines a rate at which the computing device could produce and send data to the client computer during the future period of time. Each computing device may determine or predict the rate at which the computing device would ideally produce and send data to the client computer based on the rate at which the computing device produced and sent, or would have produced or sent, data to the client computer if the client computer would not have been overloaded, for each period of one or more previous periods of time. Each computing device may determine or predict a different rate at which the computing device would ideally produce messages over the length of time that a future period of time spans. For purposes of illustrating a clear example, assume the following:

Client computer 110 is receiving data from network devices 120-160;

Client computer 110 has sent data to network devices 120-160 indicating that it can receive and process fifty megabits of data per minute, beginning at the top of each minute, and that client computer 110 is receiving data from five computing devices;

Network devices 120-160 each determines that ten megabits (ten messages) per minute is the share of bandwidth available for the network device;

Network devices 120-160 send messages that are each one megabit;

Each network device, among network devices 120-140, sent, or would have sent, an average of ten messages (ten megabits) per minute over the last five minutes if client computer 110 was able to receive and process all the messages sent without being overloaded;

Network device 150 sent, or would have sent, an average of eight messages (eight megabits) per minute over the last five minutes if client computer 110 was able to receive and process all the messages sent without being overloaded;

Network device 160 sent, or would have sent, a weighted average of twelve messages (twelve megabits) per minute over the last four minutes if client computer 110 was able to receive and process all the messages sent without being overloaded.

Accordingly, network device 120 may determine or predict that network device 120 will ideally send ten messages (ten megabits) in the minute that will start next. Network device 130 may determine or predict that network device 130 will ideally send ten messages (ten megabits) in the minute that will start next. Network device 140 may determine or predict that network device 140 will ideally send ten messages (ten megabits) in the minute that will start next. Network device 150 may determine or predict that network device 150 will ideally send eight messages (eight megabits) in the minute that will start next. Network device 160 may determine or predict that network device 160 will ideally send twelve messages (twelve megabits) in the minute that will start next.

Each computing device may use a different method for determining or predicting the ideal rate that the computing device will send data to the client computer during a particular future period. As illustrated in the previous example, network device 130 may determine or predict the rate at which network device 130 would ideally send data to client computer 110 during a future period by computing the average rate at which network device 130 sent, or would have sent, data to client computer 110 over the last n periods of time. However, network device 160 may have had a recent spike in the amount of data that network device 160 has sent, or would have sent, to client computer 110 over the past two periods. Accordingly, network device 160 may determine or predict the rate at which network device 160 would ideally send data to client computer 110 during a future period by computing a weighted average of the rate at which network device 160 sent, or would have sent, data to client computer 110 over the last n periods of time.

To improve the ability of the computing devices to agree on the boundaries of each period, and accurately determine or predict the rate at which each computing device will ideally send data to a client computer, the client computer may send synchronization data to the computing devices. For example, client computer 110 may send synchronization data to network devices 120-160. Synchronization data may include time since epoch or other clock data. The client computer 110 and network devices 120-160 need not be atomically synchronized; however, the more closely client computer 110 and network devices 120-160 are synchronized, the more accurate client computer 110 and network devices 120-160 may estimate ideal bandwidths, shares, or rates.

3.3 Determining Whether a Computing Device Needs Additional Bandwidth or has Surplus Bandwidth In step 230, each computing device, among the plurality of computing devices, determines whether the ideal rate in the previous step is less than or equal to both the share of bandwidth that the computing device expects to be available in the first step plus any additional rate allocations. If so, then control for the computing device may proceed to step 260; otherwise, control for the computing device may proceed to step 240. A rate allocation may be a portion of bandwidth that was originally expected to be available for a first computing device, but is assigned to a second computing device. For purposes of illustrating a clear example, assume the following:

Client computer 110 is receiving data from network devices 120-160;

Each network device, among network devices 120-160, has a ten-megabit share of bandwidth to send data to client computer 110 over a particular period that will start shortly;

Network devices 120-160 send messages that are each one megabit;

An "ideal rate" is the rate at which a computing device would ideally send data to client computer 110 for the particular period.

Network device 120 has an ideal rate of ten messages (ten megabits) per minute;

Network device 130 has an ideal rate of ten messages (ten megabits) per minute;

Network device 140 has an ideal rate of seven messages (seven megabits) per minute;

Network device 150 has an ideal rate of eleven messages (eleven megabits) per minute;

Network device 160 has an ideal rate of twelve messages (twelve megabits) per minute.

Accordingly, each network device, among network devices 120-140, may determine that the network device has an ideal rate that is less than or equal to its ten-megabit share of bandwidth, and proceed to step 260. Network device 150 and Network device 160 may each determine that the network device has an ideal rate that is not less than or equal to its ten-megabit share of bandwidth, and proceed to step 240.

3.4 Requesting and Distributing Rate Allocations

In step 240, the computing device requests one or more rate allocations from one or more computing devices from one or more of computing devices of the plurality of computing devices. Continuing with the previous example, network device 150 may request one or more rate allocations from network devices 120-140 and 160, and proceed to step 250. Network device 160 may request one or more rate allocations from network devices 120-150 and proceed to step 260.

In step 250, one or more computing devices distribute surplus rate allocations, if any, to one or more other computing devices of the plurality of computing devices. Continuing with the previous example, network devices 120-140 may each receive a request from network device 150 and network device 160 for rate allocations. In response to receiving the requests for rate allocations, network device 140 may send a first rate allocation of one message (one megabit) per minute to network device 150 and a second rate allocation of one message (one megabit) per minute to network device 160.

In step 260, each computer, among one or more computing devices that requested one or more rate allocations, determines whether one any rate allocation(s) were received. If so, then the computing device may return to step 230; otherwise, the computing device may proceed to step 270. Continuing with the previous example, after network devices 150-160 receive a rate allocation of one message (one megabit) per minute, network devices 150-160 may return to step 230. Network device 150 may determine that its ideal rate (eleven messages or megabits per minute) is less than or equal to its share of bandwidth (ten messages or megabits per minute) plus any additional rate allocations received (one message or megabits per minute); accordingly, network device 150 may proceed to step 250. Network device 160 may determine that its ideal rate (twelve messages or megabits per minute) is not less than or equal to its share of bandwidth plus any additional rate allocation received (eleven messages or megabits); accordingly, network device 160 may return to step 240.

In revisited step 240, network device 160 may request additional bandwidth or rate allocations from network devices 120-150. Network device 140 may receive the request and send another rate allocation of one message (one megabits) per minute to network device 160. After network device 260 receives the rate allocation, network device 160 may return to step 230 and determine that its ideal rate (twelve messages or megabits) is less than or equal to its share of bandwidth (ten messages or megabits) plus any additional rate allocation received (two messages or megabits); accordingly, network device 150 may proceed to step 250.

In an embodiment, network device 160 need not send a request for additional rate allocations to each network device among network devices 120-150. Instead, network device 160 may determine which one or more network devices already sent network device 160 one or more rate allocations for the particular period, and send a request for rate allocations for the particular period from those one or more network devices. In this example, network device 160 may send a request to network device 140 for rate allocations for the particular period, but need not send a request for rate allocations for the particular period to network devices 120, 130, or 150. Network device 160 may implicitly determine that any other network devices of network devices 120-150 do not have any surplus rate allocations.

A request for rate allocations from a first computing device to a second computing device may be a repeated to a third computing device. For example, network device 160 may request rate allocations from network device 150. If network device 150 determines that network device 150 does not have any surplus rate allocations to provide to network device 160, then network device 150 may send, to network devices 120-140, the request for rate allocations. If, for example, network device 150 receives a rate allocation from network device 130, then network device 150 may forward the rate allocation to network device 160. Also for example, in step 240, network device 160 may request rate allocations from network device 150. Network device 160 may be unaware of the IP addresses for network devices 120-140. However, network device 150 may repeat the request for rate allocations from network device 160 to network device to network devices 120-140. Network device 150 may send requests for network allocation for network device 150 to network devices 120-140 or 160. Network device 150 may receive two rate allocations from network device 140, and forward one of the rate allocations to network device 160.

3.5 Sending Messages or Data According to Distributed Rates

In step 270, each computing device, of the plurality of computing devices, during the future period of time, sends data to the client computer at an actual rate that is less than or equal to the computing devices share of bandwidth plus surplus rate allocations received, if any, minus surplus rate allocations given away, if any. Continuing with the previous example, at the beginning of the next minute each network device, among network devices 120-160, may send messages or data to client computer 110 according to the following rates:

Network device 120 did not receive or give away any rate allocations; accordingly, network device 120 may send messages or data at a rate of ten messages (ten megabits) per minute or less;

Network device 130 did not receive or give away any rate allocations; accordingly, network device 130 may send messages or data at a rate of ten messages (ten megabits) per minute or less;

Network device 140 did not receive any rate allocations, but gave away three messages (three megabits) per minute of rate allocations; accordingly, network device 140 may send messages or data at a rate of seven messages (seven megabits) per minute or less;

Network device 150 received one message (one megabits) per minute of rate allocations, but did not give away any rate allocations; accordingly, network device 150 may send messages or data at a rate of eleven messages (eleven megabits) per minute or less;

Network device 160 received two message (two megabits) per minute of rate allocations, but did not give away any rate allocations; accordingly, network device 160 may send messages or data at a rate of twelve messages (twelve megabits) per minute or less.

While step 270 is being performed during the particular period of time, the system may repeat steps 210-260 for the next period of time. The process can be repeated indefinitely. For purposes of illustrating clear examples herein, whole numbers were used; however, the total amount of available bandwidth that a client computer can receive and process, bandwidth shares, ideal rates, rate allocations, and other features discussed herein need not be whole numbers. For example, a computing device may have 2.5 messages or megabits per minute surplus to distribute to one or more computing devices sending data to a client computer.

In the example above, client computer 110 had enough bandwidth available for each network device among the network devices 120-160 to send messages for the particular period at a rate that the network device had determined or predicted to be the network device's ideal rate. However, a computing device may be unable to receive enough rate allocations for the computing device to send messages to a client computer at the computing device's ideal rate. In that case, the computing device may send messages during the particular period of time at a rate that is equal to or less than the bandwidth share and rate allocations given, if any, to the computing device. For purposes of illustrating a clear example, assume the following:

Network device 160 has an ideal rate of thirteen megabits per minute;

Network device 160 has a bandwidth share of ten megabits per minute;

Network device 160 has already received a first rate allocation of one megabits per minute.

In step 260, after sending one or more additional requests for one or more rate allocations, if network device 160 does not receive any additional rate allocations for the particular period, then network device 160 may proceed to step 270. In step 270, although network device 160 has an ideal rate of thirteen megabits per minute, network device 160 may send data at a rate of eleven megabits per minute or less during the particular period.

3.6 Prioritizing Types of Data or Messages

Some messages may be more important to a client computer than other messages. For example, messages pertaining to routine state changes ("normal messages") may not be as important to the user of client computer 110 as messages pertaining to errors ("error messages") that arise during a particular period.

In an embodiment, for a particular period, if a computing device produces messages at a rate that is greater than the bandwidth share and any additional rate allocations, then the computing device may store the messages in a queue. If a message in the queue has been stored in the queue for more than a particular amount of time, then the computing device may remove the message from the queue without sending the message to the client computer.

In an embodiment, for a particular period, if a computing device produces messages at a rate that is greater than the bandwidth share and any additional rate allocations, then the computing device may store the messages in a priority queue. The computing device may assign a priority to each message placed into the priority queue based on the data in the message. For example, if the message includes a critical error message or is from a particularly critical computer system, then the message may be given a high priority in the queue, and the computing device may send the error message to the client computer before sending any other message in the queue with a lower priority. A priority timer may be assigned to each type of message, if a message in the priority queue is associated with a particular priority and a particular priority timer, and the message is in the priority queue for an amount of time that is equal to or greater than the particular priority timer associated with that type of message, then the network computer may dynamically move the message to a lower priority or remove the message from the priority queue. A first priority timer associated with a first type of message may be different than a second priority timer associated with a second type of message.

3.7 Sending Data According to Partial Priority Rates

In an embodiment, a computing device may maintain a plurality of partial ideal rates that are each associated with a different type of message and a different priority. The sum of the plurality of partial ideal rates may be the ideal rate determined in step 220. The computing device may prioritize messages associated with a higher priority over messages with a lower priority. However, the total message output for a particular period may be capped at the bandwidth share plus any rate allocations, if any, given to the computing device for the particular period. For purposes of illustrating a clear example, assume the following:

Network device 160 sends two types of messages to client computer 110: normal messages and error messages;

Normal messages have a lower priority than error messages;

Network device 160 has a bandwidth share of 10 messages per minute.

In step 220, network device 160 may determine or predict a first ideal partial rate at which the network device 160 would ideally produce and send error messages to client computer 110 based on the rate at which the network device 160 produced and sent, or would have produced or sent, error messages to client computer 110 if client computer 110 would not have been overloaded, for each period of one or more previous periods. Network device 160 may also determine or predict a second ideal partial rate at which the network device 160 would ideally produce and send normal messages to client computer 110 based on the rate at which the network device 160 produced and sent, or would have produced or sent, normal messages to client computer 110 if client computer 110 would not have been overloaded, for each period of one or more previous periods. For purposes of illustrating a clear example, assume the first ideal partial rate is four messages per minute, and the second partial rate is ten messages per minute. The total ideal rate for network device 160 to send messages to client computer 110 is the sum of the partial rates: fourteen messages per minutes during the particular period.

The messages associated with a lower priority are capped first. For example, after receiving any additional rate allocations, in step 270, network device 160 may send error messages to client computer 110 during the particular period at a rate that is equal to or less than the lesser of either (1) the first partial rate, or (2) the bandwidth share plus any additional rate allocations received, if any. Network device 160 may send normal messages to client computer 110 during the particular period at a rate that is equal to or less than the lesser of either (1) the second partial rate, or (2) the bandwidth share plus any additional rate allocations received, if any, but minus the first partial rate.

3.8 Prioritizing Computing Devices

Some computing devices may be more important than other computing devices, or may be monitored more closely. For example, network devices 120-160 may be computers that provide various services. Network device 160 may be a computer that provides mission critical services to a company. A user or administrator monitoring the health of network devices 120-160 may prefer to monitor more states in network device 160 than other network devices 120-150, which would cause network device 160 to generate more messages than network devices 120-150. Accordingly, the user using client computer 110 may store data in a configuration file indicating that at least 50% of client computer 110's bandwidth should be available for network device 160 if needed. Accordingly, in step 210 of the process discussed above, client computer 110 may send data to network devices 120-160 indicating that client computer 110 is receiving data from network devices 120-160 and can receive and process eighty megabits per minute, beginning at the top of each minute, and that network device 160 should have a default share of 50% of the bandwidth, with the remaining default shares split equally amongst network devices 120-150. Accordingly, each network device among network devices 120-150 may determine that the network device can send ten megabits of data per minute to client computer 110 without overloading client computer 110. Network device 160 may determine that network device 160 may send up to 40 megabits of data per minute to client computer 110 without overloading client computer 110.

3.9 Faster Distribution of Rate Allocations

In the example above, step 240 was repeated by network device 160 twice (once for each request sent), and step 250 was repeated by network device 140 three times (once for each request receive for rate allocations, and each rate allocation sent). To reduce the number of times computing devices have to repeat steps, a computing device may send requests for rate allocations that indicate how much additional bandwidth the computing device needs to meet the computing device's ideal rate.

In an embodiment, each request for rate allocations may include a rate delta. A rate delta may be the amount of bandwidth that is above or below the share of bandwidth for each computing device. In the example above, network devices 120-130 had a rate delta of zero because each network device has an ideal rate that is the same as the network device's share of bandwidth. Network device 140 has a rate delta of three messages (three megabits) per minute. Network device 150 has a rate delta of −1 message (−1 megabits) per minute. Network device 160 has a rate delta of −2 messages (−2 megabits) per minute. Accordingly, in the example above, in step 240, network device 150 may send a request for rate allocations that includes a first rate delta of −1 messages (−1 megabits) per minute; network device 160 may send a request for rate allocations that includes a second rate delta of −2 messages (−2 megabits) per minute. In step 250, network device 140 may determine that the first rate delta is less than the second rate delta, and in response, allocate more rate to network device 160 than a greater amount of bandwidth to network device 160 and a lesser amount of bandwidth to network device 150.

The amount of bandwidth that a computing device may allocate to each computing device requesting a rate allocation may be based on a ratio of the rate delta in the network device's request and the sum of all the rate deltas in each received request. Continuing with the previous example, for network device 160, network device 130 may calculate the ratio of the rate delta of network device 160 (2 messages or megabits) and the total amount of rate deltas received, which in this examples includes the rate deltas from network device 150 (2 messages or megabits) and network device 160 (2 messages or megabits). Accordingly, the ratio of surplus bandwidth allocated to network device 160 may be ⅔, which in this example is 2 messages (2 megabits). The ratio of surplus bandwidth allocation to network device 150 may be ⅓, which in this example is 1 message (1 megabits).

3.10 Parallel Implementation

For purposes of illustrating a clear examples herein, each network device among network devices 120-160 executes an instance of network bandwidth distribution instructions 105. However, one or more network devices may execute, concurrently or in parallel, more than one instance of network bandwidth distribution instructions 105. Each instance may be a processes or thread executed by the network device. Each instance may perform each of the methods discussed above with respect to a network device. For example, a first instance on network device 120 may send, to client computer 110, status messages for a mission-critical service running on network device 120. A second instance on network device 120 may send, to client computer 110, status messages for a non-mission-critical service running on network device 120. The first instance on network device 120 may be treated as if a separate device with its own share of bandwidth and priority for a particular period, and the second instance on network device 120 may be treated as if a separate device with its own share of bandwidth and priority for the particular period. The first instance on network device 120 may request rate allocations from the second instance on network device 120 or other network devices, such as network devices 130-160 for the particular period. Network device 130 may request rate allocation from the first instance and the second instance on device 120. Client computer 110 may assign a higher priority to the first instance on network device 120 and a lower priority to the second instance on network device 120. In an embodiment, a client computer, such as client computer 110, may also run an instance of network bandwidth distribution instructions 105, and execute, concurrently or in parallel, the instance with an instance of client bandwidth distribution instructions 112.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
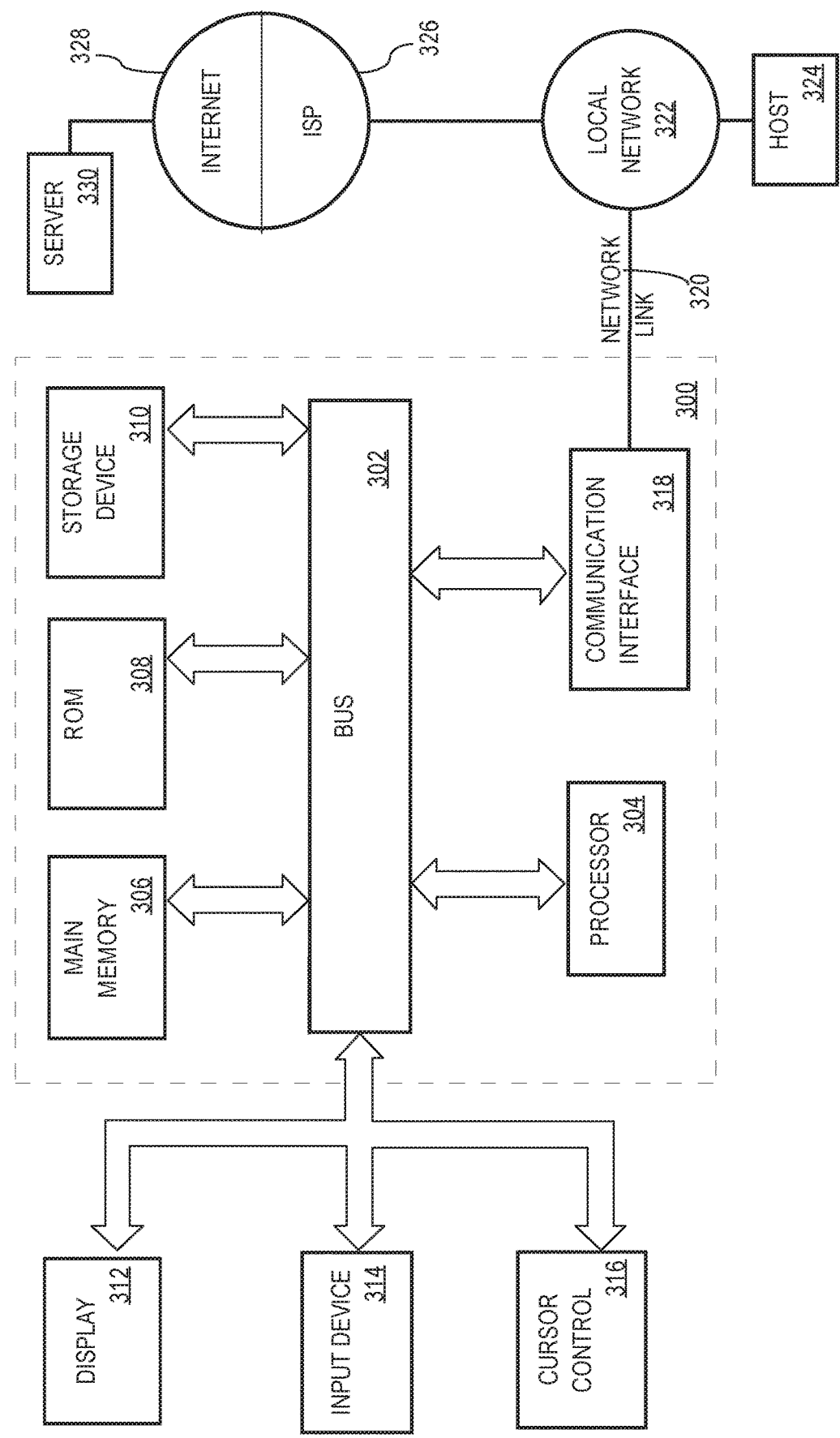
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main-memory 306, such as a random access memory (RAM) or other dynamic storage device, coupled to bus 302 for storing information and instructions to be executed by processor 304. Main-memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main-memory 306. Such instructions may be read into main-memory 306 from another storage medium, such as storage device 310. Execution of the sequences of instructions contained in main-memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main-memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main-memory 306, from which processor 304 retrieves and executes the instructions. The instructions received by main-memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server computer 330 might transmit a requested code for an application program through Internet 328, ISP 326, local network 322 and communication interface 318.

The received code may be executed by processor 304 as it is received, and/or stored in storage device 310, or other non-volatile storage for later execution.

5.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer system comprising:
 a first computing device that is programmed to:
  predict a first share of bandwidth that is to be available for the first computing device to send data to a client computer during a future period of time, wherein the client computer has a total available bandwidth over which the client computer can receive data during the future period of time without experiencing an overload;
  predict a first ideal rate at which the first computing device is to send data to the client computer during the future period of time, the first ideal rate predicted based on an average of one or more past rates at which the first computing device has sent data to the client computer during a past period of time;
  determine that the first ideal rate is less than the first share of bandwidth that is to be available for the first computing device to send data to the client computer during the future period of time by a first delta;
 a second computing device that is communicatively coupled to the first computing device and that is programmed to:

predict a second share of bandwidth that is to be available for the second computing device to send data to the client computer during the future period of time;

predict a second ideal rate at which the second computing device is to send data to the client computer during the future period of time, the second ideal rate predicted based on an average of one or more past rates at which the second computing device has sent data to the client computer during a past period of time;

determine that the second ideal rate is greater than the second share of bandwidth that is to be available for the second computing device to send data to the client computer during the future period of time by a second delta;

send a first request for a bandwidth rate allocation to one or more computing devices, which includes the first computing device;

receive, from the first computing device, a bandwidth rate allocation that is equal to or less than the first delta;

wherein the first computing device is programmed to send data to the client computer during the future period of time at a first actual rate that is less than or equal to the first ideal rate minus the bandwidth rate allocation.

2. The computer system of claim 1, wherein the first computing device is configured to determine a first amount of data that the first computing device will send to the client computer during the future period of time, and wherein the first computing device determines the first ideal rate based on the first amount of data and a length of time that the future period of time spans.

3. The computer system of claim 2, wherein the first computing device is configured to determine the first amount of data that the first computing device will send to the client computer based on one or more amounts of data that have been sent by the first computing device to the client computer during one or more previous periods of time, respectively.

4. The computer system of claim 1, wherein the first computing device and the second computing device are programmed to, for the future period of time:

determine a total number of computing devices among a plurality of computing devices that will send data to the client computer;

wherein each computing device, of the plurality of computing devices, determines a share of bandwidth that the computing device will be allocated based on the total available amount of data that the client computer is capable of receiving and the total number of computing devices in the plurality of computing devices that will send data to the client computer.

5. The computer system of claim 1, wherein the second computing device is configured to:

determine that the second ideal rate is greater than the second share of bandwidth plus the first rate allocation;

send a second request for additional rate allocation to the one or more computing devices of the plurality of computing devices.

6. The computer system of claim 5, further comprising a third computing device, and wherein the second computing device is configured to:

receive, from the third computing device, a second rate allocation;

determine that the second ideal rate is less than or equal to the second share of bandwidth plus the first rate allocation and the second rate allocation;

send data to the client computer at a second actual rate that is less than or equal to the second share of bandwidth plus the first rate allocation and the second rate allocation.

7. The computer system of claim 5, further comprising a third computing device wherein the first computing device is communicatively coupled to a third computing device, and wherein the first computing device is configured to perform, in response to receiving the second request for additional bandwidth allocation:

send a third request for additional rate allocation to the third computing device;

receive, from the third computing device, a second rate allocation;

send the second rate allocation to the second computing device;

wherein the second computing device is configured to:

receive, from the first computing device, the second rate allocation;

determine that the second ideal rate is less than or equal to the second share of bandwidth plus the first rate allocation and the second rate allocation;

send data to the client computer at a second actual rate that is less than or equal to the second share of bandwidth plus the first rate allocation and the second rate allocation.

8. The computer system of claim 1, wherein the second computing device is configured to:

determine a first partial rate at which the second computing device is to send data associated with a first priority to the client computer;

determine a second partial rate at which the second computing device is to send data associated with a second priority to the client computer;

wherein the second ideal rate is a sum of at least the first partial rate and the second partial rate;

determine that the first partial rate is less than the second share of bandwidth plus the first rate allocation;

send data in a plurality of first messages associated with the first priority at a second actual rate that is equal to or less than the first partial rate;

send data in a plurality of second messages associated with the second priority at a third actual rate that is equal to or less than the sum of the second share of bandwidth plus the first rate allocation, but minus the first partial rate.

9. The computer system of claim 1, further comprises a third computing device, wherein the first request includes the second delta, and the third computing device is configured to:

determine a third ideal rate at which the third computing device is to send data to the client computer during the future period of time;

determine that the third ideal rate is greater than a third share of bandwidth that the third computing device is to be available during the future period of time by a third delta;

send a second request for additional rate allocation to the one or more computing devices of the plurality of computing devices, wherein the second request includes the third delta;

wherein the first computing device is configured to:
receive, from the second computing device, the first request with the second delta;
receive, from the third computing device, the second request with the third delta;
determine that the second delta is greater than the third delta, and in response:
send, to the second computing device, the first rate allocation, wherein the first rate allocation is less than the first delta;
send, to the third computing device, a second rate allocation, wherein the second rate allocation is less than the first delta and the first rate allocation.

10. The computer system of claim 1, wherein the first computing device is associated with a first priority, the second computing device is associated with a second priority, the first share of bandwidth is greater than the second share of bandwidth based on the first priority being higher than the second priority.

11. A method for rationing the amount of bandwidth used by a plurality of network computing devices sending data to a client computer, the method comprising:
predicting a first share of bandwidth that is to be available for a first computing device, among the plurality of network computing devices, to send data to the client computer during a first future period of time, wherein the client computer has a total available bandwidth over which the client computer can receive data during the future period of time without experiencing an overload;
predicting a first ideal rate at which the first computing device is to send data to the client computer during the first future period of time, the first ideal rate predicted based on an average of one or more past rates at which the first computing device has sent data to the client computer during a past period of time;
determining that the first ideal rate is less than the first share of bandwidth that is to be available for the first computing device to send data to the client computer during the first future period of time by a first delta;
receiving, from a second computing device among the plurality of network computing devices, a first request for a bandwidth rate allocation;
sending, to the second computing device, a first bandwidth rate allocation that is equal to or less than the first delta;
sending data to the client computer during the first future period of time at a first actual rate that is less than or equal to the first ideal rate minus the first bandwidth rate allocation;
wherein the method is performed by one or more processors.

12. The method of claim 11 comprising determining a first amount of data that the first computing device will send to the client computer during the first future period of time, wherein the first computing device determines the first ideal rate based on the first amount of data and a length of time that the first future period of time spans.

13. The method of claim 12 comprising determining the first amount of data that the first computing device will send to the client computer based on one or more amounts of data that have been sent by the first computing device to the client computer during one or more previous periods of time, respectively.

14. The method of claim 11 comprising:
determining a total number of computing devices among a plurality of computing devices that will send data to the client computer;
determining a share of bandwidth that the first computing device will be allocated based on the total available amount of data that the client computer is capable of receiving and the total number of computing devices in the plurality of computing devices that will send data to the client computer.

15. The method of claim 11, wherein the method further comprises:
determining a second share of bandwidth that is to be available for the first computing device to send data to the client computer during a second future period of time;
determining a second ideal rate at which the first computing device is to send data to the client computer during the second future period of time;
determining that the second ideal rate is greater than the second share of bandwidth that is to be available for the first computing device to send data to the client computer during the second future period of time by a second delta;
sending a second request for additional rate allocation to one or more computing devices of the plurality of network computing devices, which includes a third computing device;
receiving, from the third computing device, a second rate allocation that is equal to or less than the second delta.

16. The method of claim 15 comprising:
determining that the second ideal rate is greater than the second share of bandwidth plus the second rate allocation;
sending a second request for additional rate allocation to a fourth computing device among the plurality of network computing devices of the plurality of computing devices.

17. The method of claim 16 comprising:
receiving, from the fourth computing device, a third rate allocation;
determine that the second ideal rate is less than or equal to the second share of bandwidth plus the second rate allocation and the third rate allocation;
sending data to the client computer at a second actual rate that is less than or equal to the second share of bandwidth plus the second rate allocation and the third rate allocation.

18. The method of claim 15 comprising:
determining a first partial rate at which the second computing device is to send data associated with a first priority to the client computer;
determining a second partial rate at which the second computing device is to send data associated with a second priority to the client computer;
wherein the second ideal rate is a sum of at least the first partial rate and the second partial rate;
determining that the first partial rate is less than the second share of bandwidth plus the second rate allocation;
send data in a plurality of first messages associated with the first priority at a second actual rate that is equal to or less than the first partial rate;
send data in a plurality of second messages associated with the second priority at a third actual rate that is equal to or less than the sum of the second share of bandwidth plus the first rate allocation, but minus the first partial rate.

19. The method of claim 11 comprising:
receiving, from a third computing device among the plurality of network computing devices, a second request with a third delta;
wherein the first request includes a second delta;
determining that the second delta is greater than the third delta, and in response:
sending, to the third computing device, a second rate allocation, wherein the second rate allocation is less than the first delta and the first rate allocation;
wherein the first rate allocation is less than the first delta.

\* \* \* \* \*